United States Patent
Kasal et al.

(10) Patent No.: US 10,646,915 B2
(45) Date of Patent: May 12, 2020

(54) SHELL METAL CORE BOX STRUCTURE AND METHOD

(71) Applicant: HONEYWELL INTERNATIONAL INC., Morris Plains, NJ (US)

(72) Inventors: Yathiraj Kasal, Karnataka (IN); Michael G. Volas, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 274 days.

(21) Appl. No.: 15/819,898

(22) Filed: Nov. 21, 2017

(65) Prior Publication Data
US 2019/0151933 A1 May 23, 2019

(51) Int. Cl.
| | | |
|---|---|---|
| *B22C 9/10* | (2006.01) | |
| *B22C 7/06* | (2006.01) | |
| *B33Y 80/00* | (2015.01) | |
| *B33Y 10/00* | (2015.01) | |
| *B22C 7/02* | (2006.01) | |

(52) U.S. Cl.
CPC ............... *B22C 9/10* (2013.01); *B22C 7/02* (2013.01); *B22C 7/06* (2013.01); *B33Y 10/00* (2014.12); *B33Y 80/00* (2014.12)

(58) Field of Classification Search
CPC .................................. B22C 7/06; B22C 9/10
See application file for complete search history.

(56) References Cited

U.S. PATENT DOCUMENTS

| | | | |
|---|---|---|---|
| 6,397,922 B1 * | 6/2002 | Sachs ....................... | B22C 9/00 164/4.1 |
| 2013/0220570 A1 | 8/2013 | Sears et al. | |
| 2013/0221191 A1 | 8/2013 | Sears et al. | |
| 2016/0193651 A1 | 7/2016 | Orange et al. | |

OTHER PUBLICATIONS

Cotteleer, M., et al.; 3D Oportunity In Tooling; Additive Manufacturing Shapes The Future; Deloitte University Press, 2014.

* cited by examiner

*Primary Examiner* — Kevin E Yoon
(74) *Attorney, Agent, or Firm* — Lorenz & Kopf, LLP

(57) ABSTRACT

A structure and method are provided for forming a box for molding an article for use in casting. A wall defines a cavity formed in a shape of the article and configured to receive a material for forming the article. A rim is disposed around the wall and extends therefrom defining a hollow back on an opposite side of the wall from the cavity. A lattice structure formed in the hollow back and is connected with the wall and with the rim. The box may be formed by additive manufacturing.

18 Claims, 8 Drawing Sheets

SHELL METAL CORE BOX STRUCTURE AND METHOD

TECHNICAL FIELD

The present invention generally relates to core boxes, sand molds and pattern boxes, and more particularly relates to boxes, molds and dies used to make articles such as cores and patterns for casting processes.

BACKGROUND

Various types of articles may be used in casting and molding processes to form internal cavities, channels and other open areas. One such article is a core that is typically discarded after one use and is often destroyed for removal from the casting. Common core materials include wax, ceramic materials, polymers, or sand combined with a binder. Patterns may also be used in casting and molding processes where the pattern is displaced by molten material to form a part. Other articles include sand molds. A box may be used to form the core, mold, pattern or other article. The box may be made from a variety of materials such as epoxy, wood or metal. The shape needed for the core, mold or pattern is created in the core, mold or pattern box such as through 3D machining of a solid block of material. Wood and epoxy boxes have limited useful lives and metal boxes are heavy and costly. Therefore, new methods and structures for core, mold and pattern boxes would be beneficial.

Accordingly, it is desirable to provide structures and methods for effective and economical core/mold/pattern boxes. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A number of embodiments include a box for molding an article for use in casting. A wall defines a cavity formed in a shape of the article and is configured to receive a material for forming the article. A rim is disposed around the wall and extends therefrom defining a hollow back on an opposite side of the wall from the cavity. A lattice structure is formed in the hollow back and is connected with the wall and with the rim.

Other embodiments include a method of making a box for forming an article for use in casting. The box is formed by additive manufacturing in a shell-like shape with a wall contoured in a desired article shape. As a part of the contour, a cavity is defined in a front of the wall and is configured for receiving a material for forming the article. A rim is formed around the wall so that the core, mold or pattern box has a hollow back. A lattice structure is formed in the hollow back to support the wall and the rim.

In additional embodiments, a method of making a box for forming an article for use in casting, includes a box that has a rim with opposite first and second sides connected by a wall. The first side is formed by additive manufacturing. A lattice and the wall are formed by additive manufacturing on top of the first side. The second side is formed by additive manufacturing on top of the lattice and the wall. The formed box has a shell-like shape and the wall is contoured in a desired article shape. A cavity is defined in a front of the wall and is configured for receiving a material for forming the article, and the lattice is formed on an opposite side of the wall from the cavity.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
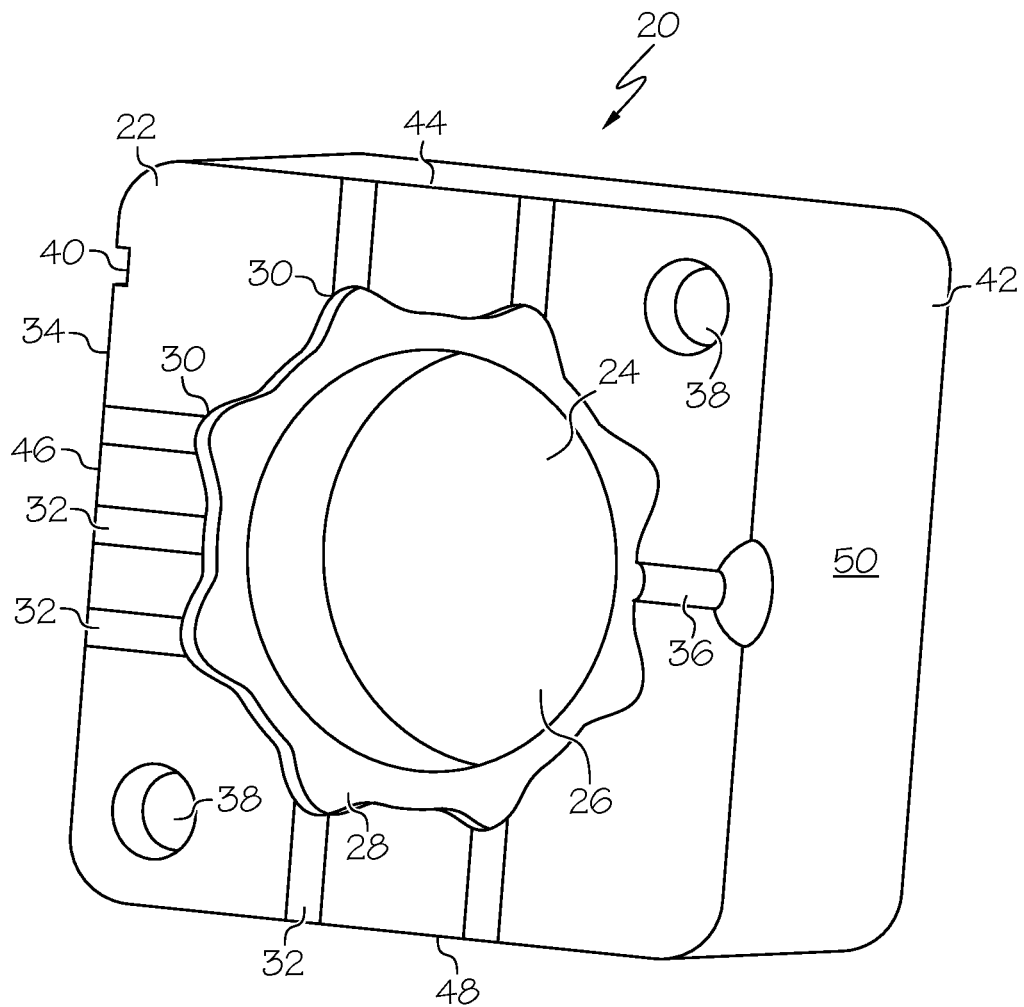
FIG. 1 is a perspective illustration of a core box, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, structures and methods are disclosed for forming a box for making cores, molds, patterns, and other articles for use in casting processes. Generally, the box, which may sometimes be referred to below in a generic, non-limiting manner as a core box, is a mold type of item constructed of a shell metal structure. The metal used to construct the core box may be steel, aluminum alloy, or another metal material appropriate for the application. Rather than being machined from a solid blank, the core box may be built up through additive manufacturing. As a result, the weight, cost and lead time associated with a machined box is avoided. Additive manufacture includes processes such as those that create a physical object by the successive addition of particles, layers or other groupings of a material. The object is generally built using a computer controlled machine based on a digital representation, and includes processes such as 3-D printing. A variety of additive manufacturing processes may be used such as processes that involve powder bed fusion, laser metal deposition, material jetting, or other methods.

In an exemplary embodiment described in more detail below, a structure and method are provided for making a core box, mold or pattern box for forming an article used in casting. The box may be formed by additive manufacturing, and may be shaped as a shell with a wall contoured in a desired core, mold or pattern shape. A cavity is defined in a front of the wall and is configured for receiving core, mold or pattern material. A rim is formed around the wall so that the core box, mold or pattern box has a hollow back. A lattice structure may be formed in the hollow back to provide structural support to the wall and the rim.

The following description relates to examples of boxes for forming cores used in casting, such as to form internal cavities. The boxes may include features to accommodate the introduction of material to fill the core box with a liquid such as wax, which then solidifies. The current disclosure is not limited to wax core applications, but applies to boxes for various types of cores, molds, patterns, and the like, that may be formed from wax, sand, polymer, or another material appropriate for the applicable casting process. In addition, a box may be open, where the cavity that defines the core, mold or pattern is filled with a material such as sand, or the box may include mating halves with a facility to fill the cavity, where the halves are separated to remove the formed core, mold or pattern.

Referring to FIG. 1, a box 20, which in this example is a core box for forming cores from a wax material, generally includes a wall 22 contoured in the desired core shape with a depression in the form of a cavity 24 for receiving and forming the core material. In this example, the box 20 is half of a die set that is mated together to close the cavity 24. In other embodiments, the cavity 24 may remain open with the core material introduced directly into the cavity 24 from its open side. The wall 22 is generally planar in character with the cavity 24 substantially closed on all sides other than its side at the plane of the wall 22, which is open. It will be appreciated that in this embodiment, the cavity 24 is also substantially closed in the foreground as viewed, by the mating half (not illustrated), of the die set. In other embodiments, the cavity 24 remains open as shown and the core, mold or pattern material may be poured in through the open side. In the current embodiment, the cavity 24 includes a body area 26 that is substantially cylindrical in shape and a flange area 28 that surrounds the body area 26 at a location adjacent the wall 22. The flange area 28 includes a number of projecting lobe portions 30 that extend outward relative to the body area 26.

A number of grooves 32 are formed in the wall 22 and extend from the flange area 28 to an edge 34 at the outer periphery of the wall 22. The grooves 32 serve as vent ports for those embodiments where the die set is closed, to allow air to escape as the cavity 24 is filled. In this embodiment, a fill port 36 extends from the cavity 24 to the edge 34. When the die set is joined together, the core material is delivered to the cavity 24 through the fill port 36, and air from the cavity 24 escapes through the grooves 32 as the cavity 24 is filled. The wall 22 includes dimples 38 to receive alignment pins from the mating die half and a slot 40 at the edge 34 to receive a mating die fixturing pin for alignment purposes.

Figure 2:
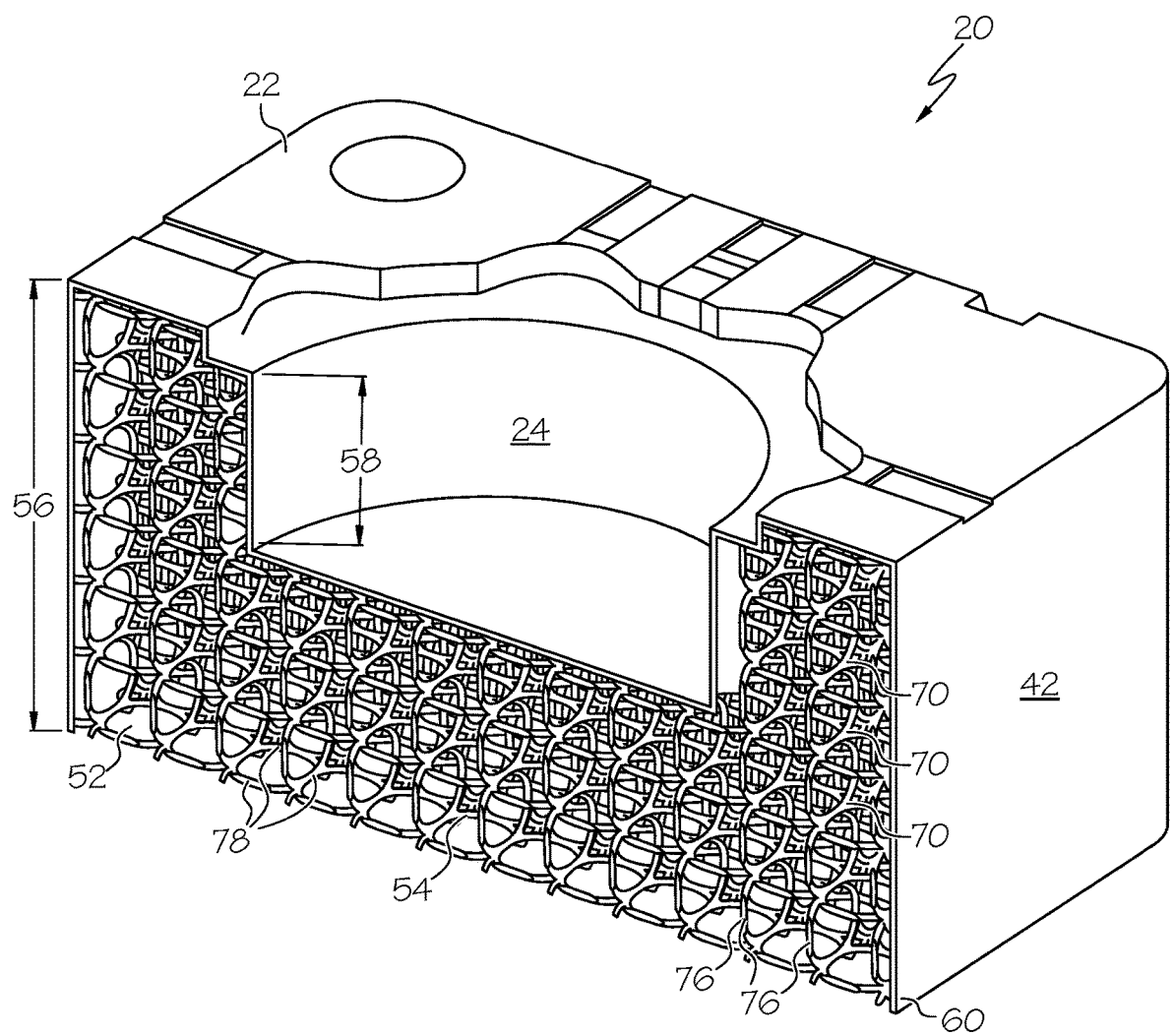
FIG. 2 is a perspective, cross-sectional illustration of the core box of FIG. 1 taken generally through the line indicated as 2-2, according to an exemplary embodiment.
Figure 3:
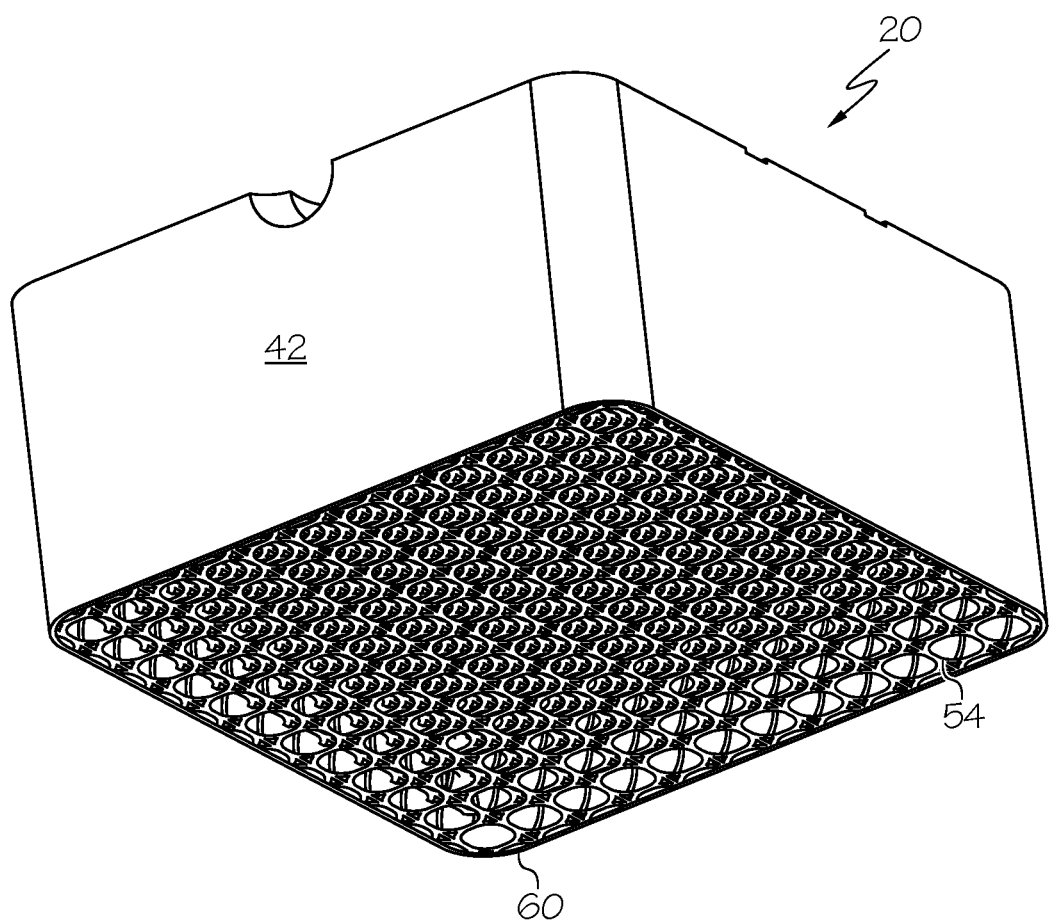
FIG. 3 is a perspective illustration of the core box of FIG. 1, according to an exemplary embodiment.

Referring additionally to FIGS. 2 and 3, the box 20 includes a rim 42 surrounding the wall 22 that extends from the wall 22 in the same direction that the cavity 24 extends into the wall 22. In this embodiment, the rim 42 has four sides 44, 46, 48 and 50, each of which joins with its adjacent sides and with the wall 22 at its edge 34. Accordingly, the wall 22 and the rim 42 form a shell shaped structure with a hollow back 52 on an opposite side of the wall 22 from the cavity 24. The hollow back 52 contains a lattice 54 as further described below. The rim 42 extends from the wall 22 a distance 56 that is greater than the depth 58 of the cavity 24. As a result, the rim 42 forms a base 60 that is disposed in a common plane that is spaced apart from the plane of the wall 22. As a result, the base 60 presents a structure that may be stably supported on a flat surface. In some embodiments, the rim 42 may extend a distance that is less than, or equal to, the depth 58 of the cavity 24.

Figure 4:
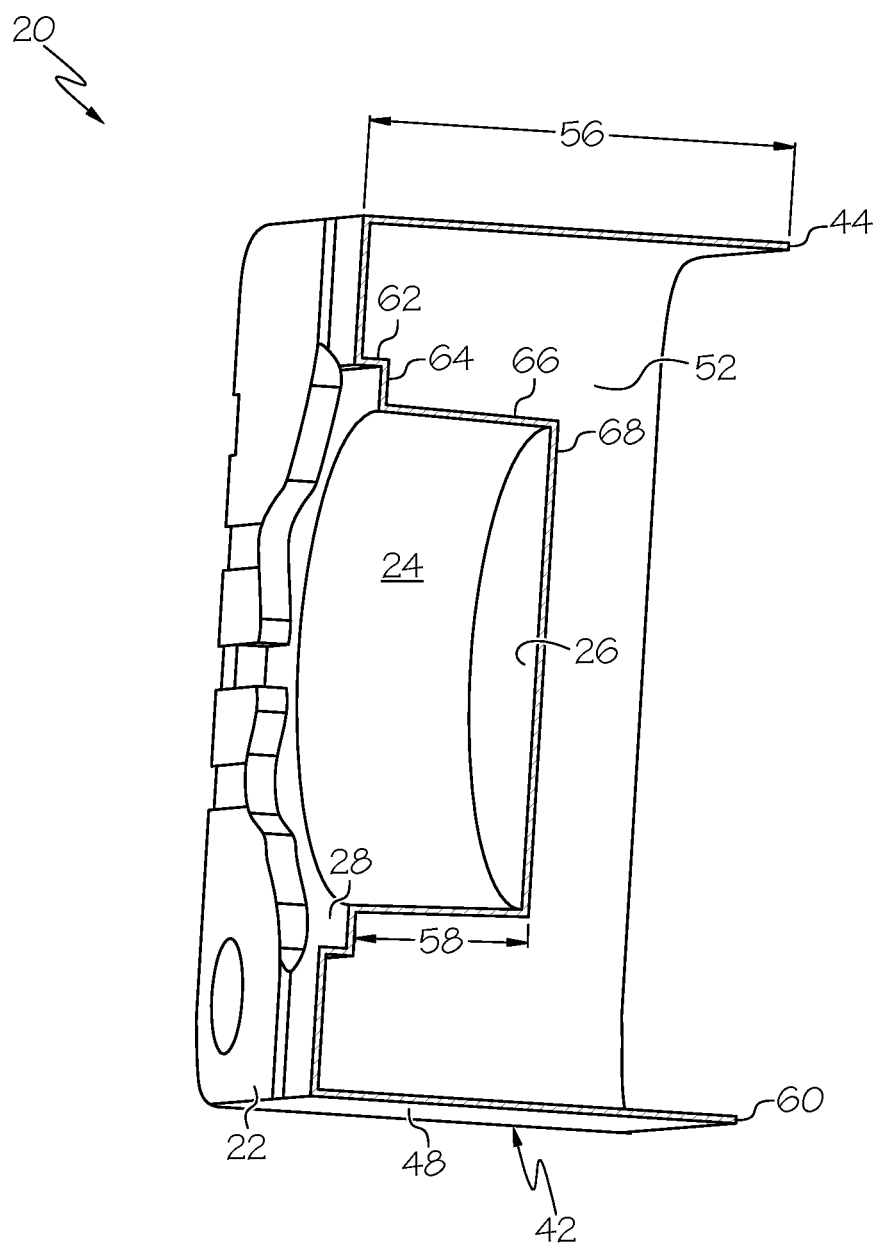
FIG. 4 is a perspective, cross-sectional illustration of the core box of FIG. 1, with the lattice structure omitted.

In FIG. 4, the box 20 is shown in cross section with the lattice 54 omitted. As apparent, the wall 22 and the rim 42 form a shell-like structure with the hollow back 52. In contrast to a box machined from a solid block of material, the box 20 advantageously has a lower cost and weight. The cavity 24 is defined by the flange area 28 and the body area 26. The flange area 28 is defined by a rim 62 around its perimeter that joins with the wall 22 and extends from the wall 22 in a direction over the hollow back 52. The flange area 28 is also defined by a ledge 64 that joins with the rim 62, is perpendicular thereto, and extends inward from the rim 62. The body area 26 is defined by a cylindrical portion 66 that joins with the ledge 64 and extends toward the hollow back 52, and a bottom portion 68 that joins with the cylindrical portion 66.

Figure 5:
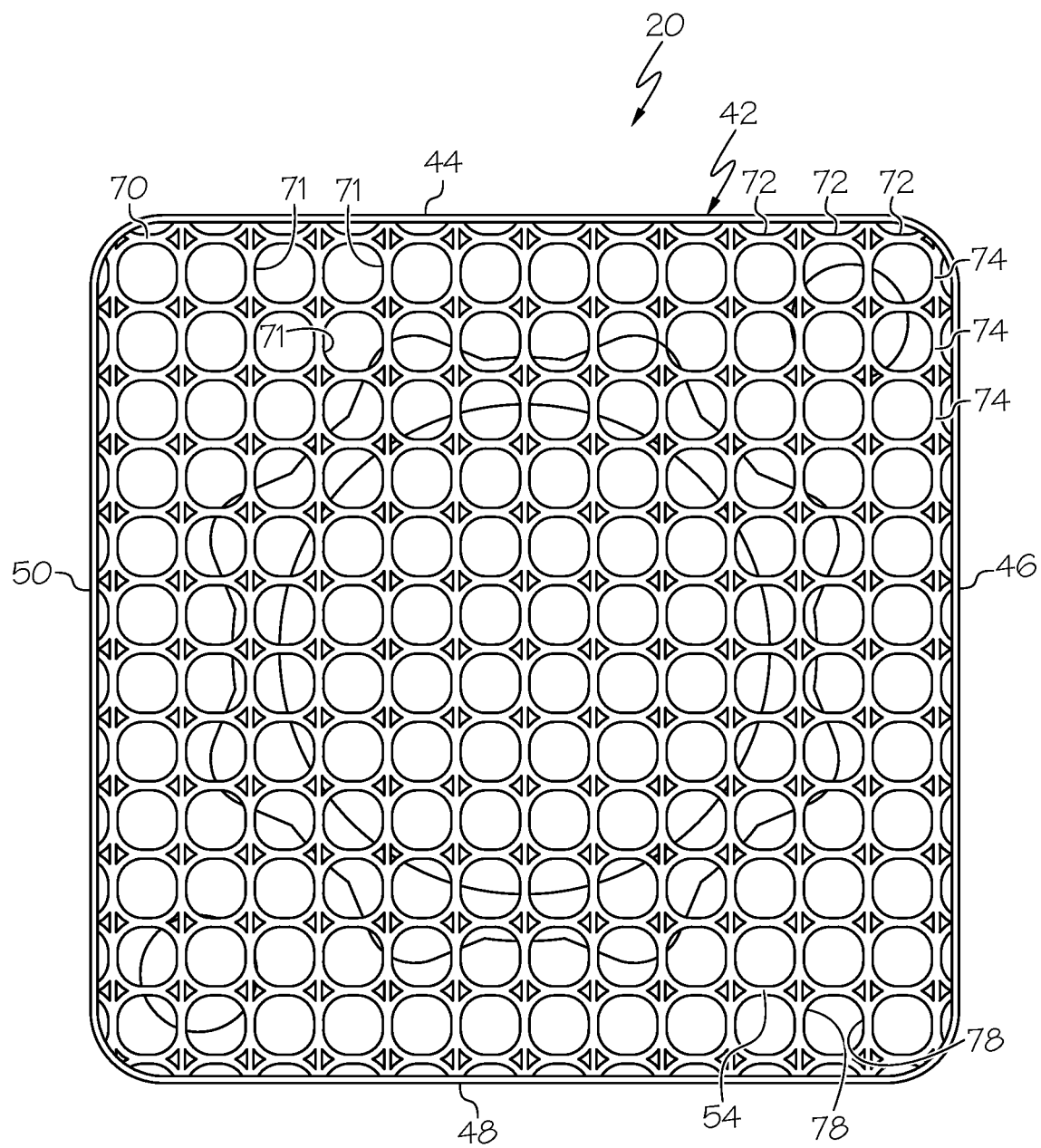
FIG. 5 is a back-view illustration of the core box of FIG. 1, according to an exemplary embodiment.
Figure 6:
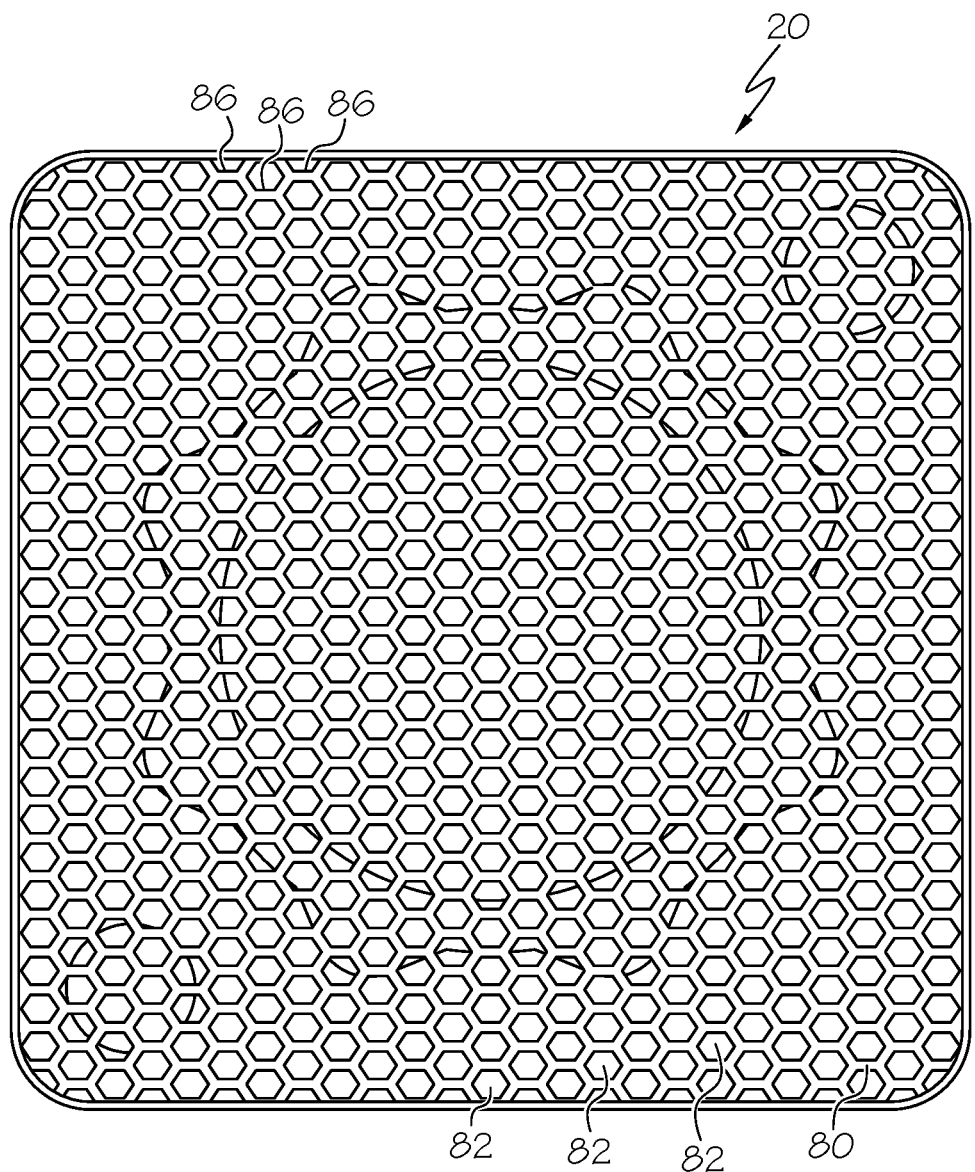
FIG. 6 is a back-view illustration of the core box of FIG. 1, with a lattice structure according to an additional exemplary embodiment.
Figure 7:
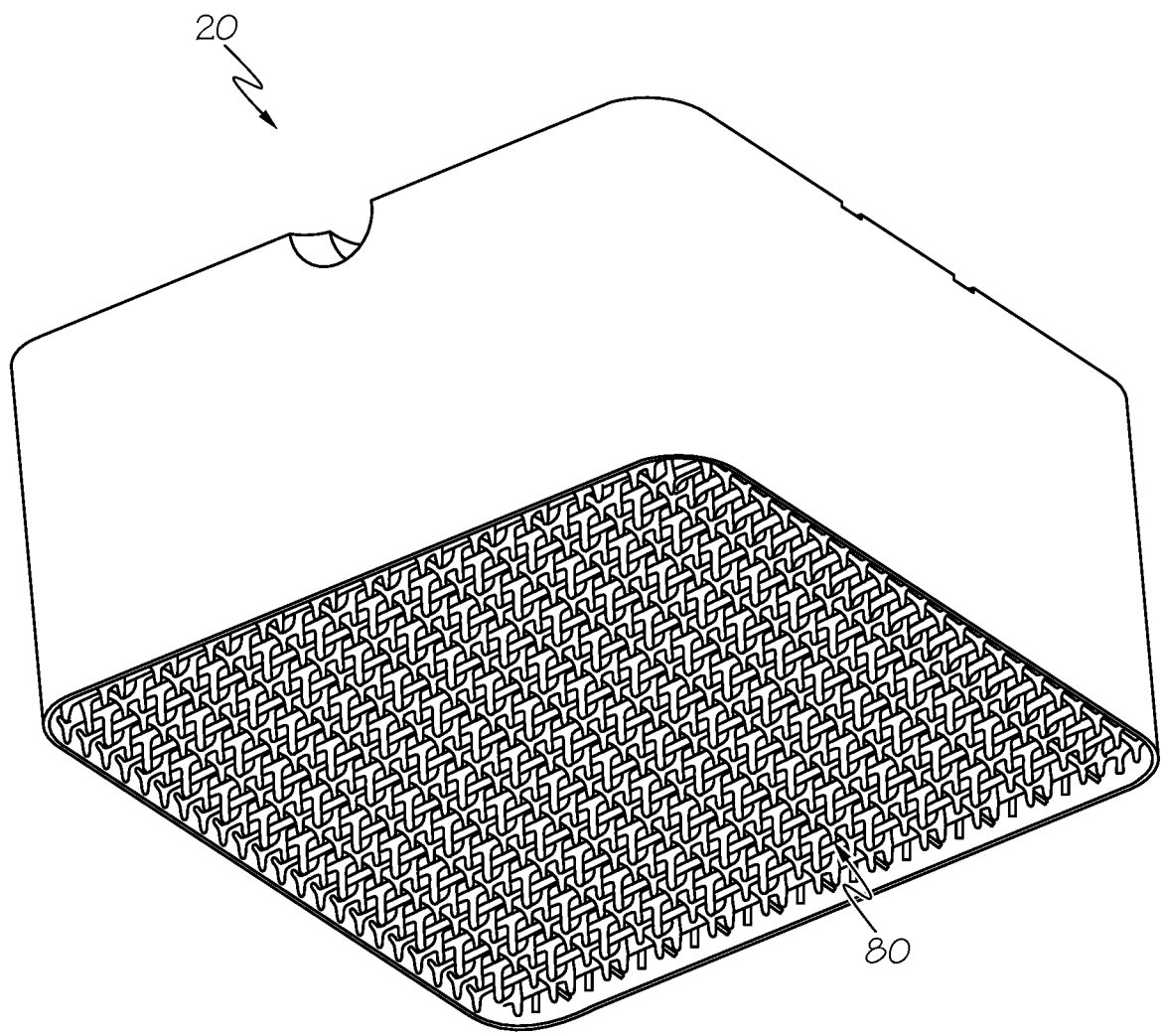
FIG. 7 is a perspective illustration of the core box of FIG. 6, according to an exemplary embodiment.
Figure 8:
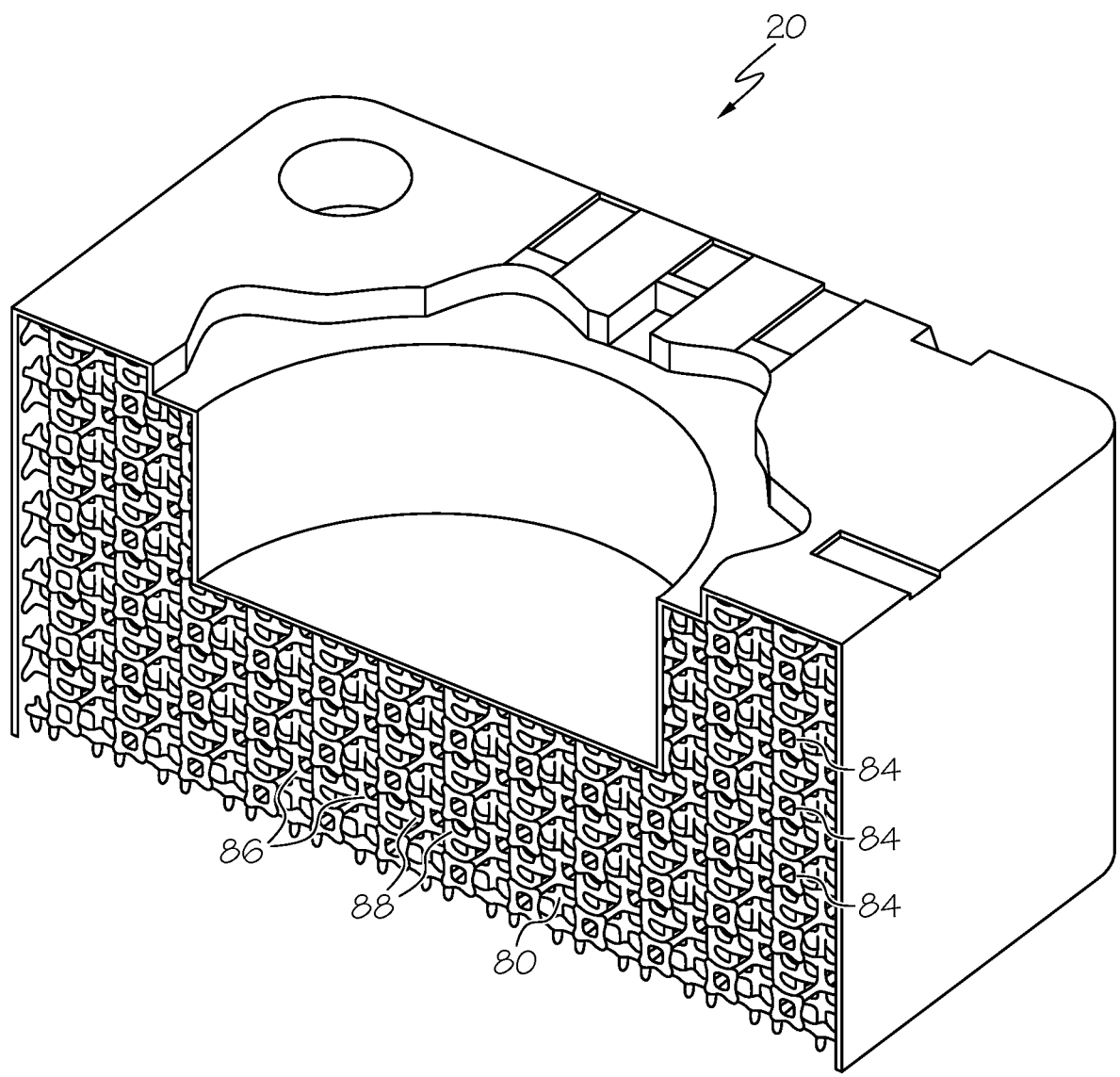
FIG. 8 is a perspective, cross-sectional illustration of the core box of FIG. 6, according to an exemplary embodiment.

With reference to FIG. 5 along with FIGS. 2 and 3, the hollow back 52 is filled with the lattice 54 that joins with the wall 22, the rim 42, the rim 62, the ledge 64, the cylindrical portion 66 and the bottom portion 68. The lattice 54 is built in the hollow back 52 and extends to the base 60. Between the base 60 and the wall 22, the lattice 54 includes layers 70 of interconnected circular cells 71 arranged in rows 72 and rows 74 that are oriented ninety degrees relative to the rows 72. The cells 71 are uniform and are aligned in both the direction of the rows 72 and the rows 74. The layers 70 are interconnected with one another by columnar elements 76 at each of the cells 71. The cells 71 are formed by individual strands 78 which form the layers 70 and the columnar elements 76. The box 20 with the lattice 54, is built by additive manufacturing as oriented in FIG. 4 with the side 48 at the bottom and the side 44 at the top. As material is deposited, the side 48 is formed first, with the wall 22 and the lattice 54 then formed on top of the side 48. The side 44 is built up last in the process to complete the box 20. FIGS. 6-8 illustrate an embodiment of the box 20 with a lattice 80 built with hexagonal shaped cells 82 in layers 84, where each row 86 is offset relative to its adjacent rows 86 by half a cell 82. The layers 84 in the lattice 80 are spaced apart and are interconnected with one another by columnar elements 88. The lattice 80 includes cells of greater density than the lattice 54, and therefore is capable of bearing higher loads and stresses. By use of the lattice 54, 80 the majority of the hollow back 52 remains open space, while the lattice elements provide strength and support to the box 20. Inclusion of the lattice 54, 80 provides a supporting structure that enables the shell-like structure of the box 20, while providing durability for a longer service life.

Through the examples described herein, shell-like metal box structures and methods are provided for molding cores, molds, patterns, and the like for use in casting processes. The boxes may be formed through additive manufacturing, with lattice filled hollow backs on the side opposite the cavity that defines the shape of the core, mold or pattern. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A box for forming an article for use in casting comprising:
    a wall with a cavity defined in the wall, the cavity formed in a shape of the article and configured to receive a material for forming the article;
    a rim disposed around the wall and extending therefrom defining a hollow back on an opposite side of the wall from the cavity; and
    a lattice structure formed in the hollow back and connected with the wall and with the rim, wherein the wall, the rim and the lattice comprise a metal material.

2. The box of claim 1 wherein the cavity has a depth from the wall and wherein the wall has an edge, wherein the rim extends from the edge a distance that is greater than the depth.

3. The box of claim 1 wherein the lattice comprises cells that entirely fill the hollow back.

4. The box of claim 1 wherein a majority of the hollow back is empty space within the lattice.

5. The box of claim 1 wherein the lattice comprises a series of layers of cells interconnected by columnar elements.

6. The box of claim 1 wherein the lattice is interconnected with a structure that defines the cavity.

7. The box of claim 1 wherein the wall and the rim form a shell-like structure supported by the lattice.

8. The box of claim 1 wherein the rim has opposite first and second sides and the lattice extends from the first side to the second side.

9. The box of claim 1 formed by a process comprising:
    forming the first side by additive manufacturing;
    forming, by additive manufacturing, the lattice and the wall in top of the first side; and
    forming, by additive manufacturing the second side on top of the lattice and the wall.

10. A method of making a box for forming an article for use in casting, comprising:
    forming, by additive manufacturing, the box in a shell-like shape with a wall contoured in a desired article shape so that a cavity is defined in a front of the wall and is configured for receiving a material for forming the article;
    forming a rim around the wall so that the box has a hollow back with a lattice structure formed in the hollow back to support the wall and the rim; and forming the wall, the rim and the lattice of a metal material.

11. The method of claim 10 comprising:
    forming the cavity to have a depth from the wall; and
    forming the rim to extend from the wall a distance that is greater than the depth.

12. The method of claim 10 comprising forming the lattice of cells that entirely fill the hollow back.

13. The method of claim 10 comprising leaving a majority of the hollow back as empty space within the lattice.

14. The method of claim 10 comprising forming the lattice as a series of layers of cells interconnected by columnar elements.

15. The method of claim 10 comprising interconnecting the lattice with a structure that defines the cavity.

16. The method of claim 10 comprising:
    forming the wall and the rim as a shell-like structure; and
    supporting the wall and the rim by the lattice.

17. The method of claim 10 comprising:
    forming the rim with opposite first and second sides; and
    forming the lattice to extend from the first side to the second side.

18. A method of making a box for forming an article for use in casting, wherein the box has a rim with opposite first and second sides connected by a wall, the method comprising:
    forming, by additive manufacturing, the first side;
    forming, by additive manufacturing, a lattice and the wall on top of the first side;
    forming, by additive manufacturing the second side on top of the lattice and the wall;
    wherein the box has a shell-like shape and the wall is contoured in a desired article shape so that a cavity is defined in a front of the wall and is configured for receiving a material for forming the article, wherein the lattice is formed on an opposite side of the wall from the cavity; and forming the wall, the first side, the second side and the lattice of a metal material.

* * * * *